United States Patent
Koetzinger

(10) Patent No.: US 11,198,358 B2
(45) Date of Patent: Dec. 14, 2021

(54) MOTOR VEHICLE DRIVE DEVICE

(71) Applicant: Bayerische Motoren Werke Aktiengesellschaft, Munich (DE)

(72) Inventor: Georg Koetzinger, Bergen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/260,651

(22) PCT Filed: Sep. 24, 2019

(86) PCT No.: PCT/EP2019/075587
§ 371 (c)(1),
(2) Date: Jan. 15, 2021

(87) PCT Pub. No.: WO2020/069903
PCT Pub. Date: Apr. 9, 2020

(65) Prior Publication Data
US 2021/0309094 A1    Oct. 7, 2021

(30) Foreign Application Priority Data
Oct. 4, 2018 (DE) .................. 10 2018 124 489.4

(51) Int. Cl.
*B60K 6/26* (2007.10)
*B60K 6/485* (2007.10)
(Continued)

(52) U.S. Cl.
CPC .............. *B60K 6/485* (2013.01); *B60K 6/26* (2013.01); *B60K 6/383* (2013.01); *F16D 45/00* (2013.01);
(Continued)

(58) Field of Classification Search
CPC .......... B60K 6/485; B60K 6/383; B60K 6/26; B60K 2006/4825; B60K 2006/268; F16D 45/00; F16D 47/04
See application file for complete search history.

(56) References Cited

U.S. PATENT DOCUMENTS 8,776,921 B2 *  7/2014  Richter ........... B60W 30/18027
                                                180/65.285
9,002,553 B2 *  4/2015  Kamoshida ........... B60K 6/547
                                                701/22
(Continued)

FOREIGN PATENT DOCUMENTS

DE       199 41 705 A1      3/2000
DE    10 2006 018 057 A1   11/2007
(Continued)

OTHER PUBLICATIONS

International Search Report (PCT/ISA/210) issued in PCT Application No. PCT/EP2019/075587 dated Feb. 7, 2020 with English translation (four (4) pages).
(Continued)

*Primary Examiner* — David J Hlavka
(74) *Attorney, Agent, or Firm* — Crowell & Moring LLP

(57) ABSTRACT

A motor vehicle drive apparatus includes a device configured to connect an internal combustion engine to an electromechanical energy converter, and first and second drive trains. The second drivetrain is arranged parallel to the first drivetrain in relation to torque transmission between the electromechanical energy converter and the internal combustion engine. The first drivetrain has a one-way clutch which is set up in such a manner that torque is transmittable via the first drivetrain from the electromechanical energy converter to the internal combustion engine during starting of the internal combustion engine. The second drivetrain has a speed-sensitive clutch which in a first state is open until a
(Continued)

first speed threshold is reached, so that in the first state no torque is transmittable with the second drivetrain from the internal combustion engine to the electromechanical energy converter. The speed-sensitive clutch is closed from the crossing of this first speed threshold.

9 Claims, 1 Drawing Sheet

(51) Int. Cl.
*B60K 6/383* (2007.10)
*F16D 47/04* (2006.01)
*F16D 45/00* (2006.01)
*B60K 6/48* (2007.10)

(52) U.S. Cl.
CPC ........ *F16D 47/04* (2013.01); *B60K 2006/268* (2013.01); *B60K 2006/4825* (2013.01)

(56) References Cited

U.S. PATENT DOCUMENTS

| 2002/0117860 A1 | 8/2002 | Man et al. |
| 2007/0246273 A1 | 10/2007 | Tenbrock et al. |
| 2017/0259810 A1 | 9/2017 | Zhang et al. |

FOREIGN PATENT DOCUMENTS

| DE | 10 2015 208 637 A1 | 11/2016 |
| DE | 10 2017 105 066 A1 | 9/2017 |
| JP | 2004-278367 A | 10/2004 |

OTHER PUBLICATIONS

German-language Written Opinion (PCT/ISA/237) issued in PCT Application No. PCT/EP2019/075587 dated Feb. 7, 2020 (five (5) pages).

German-language Office Action issued in German Application No. 10 2018 124 489.4 dated Jun. 12, 2019 (four (4) pages).

* cited by examiner

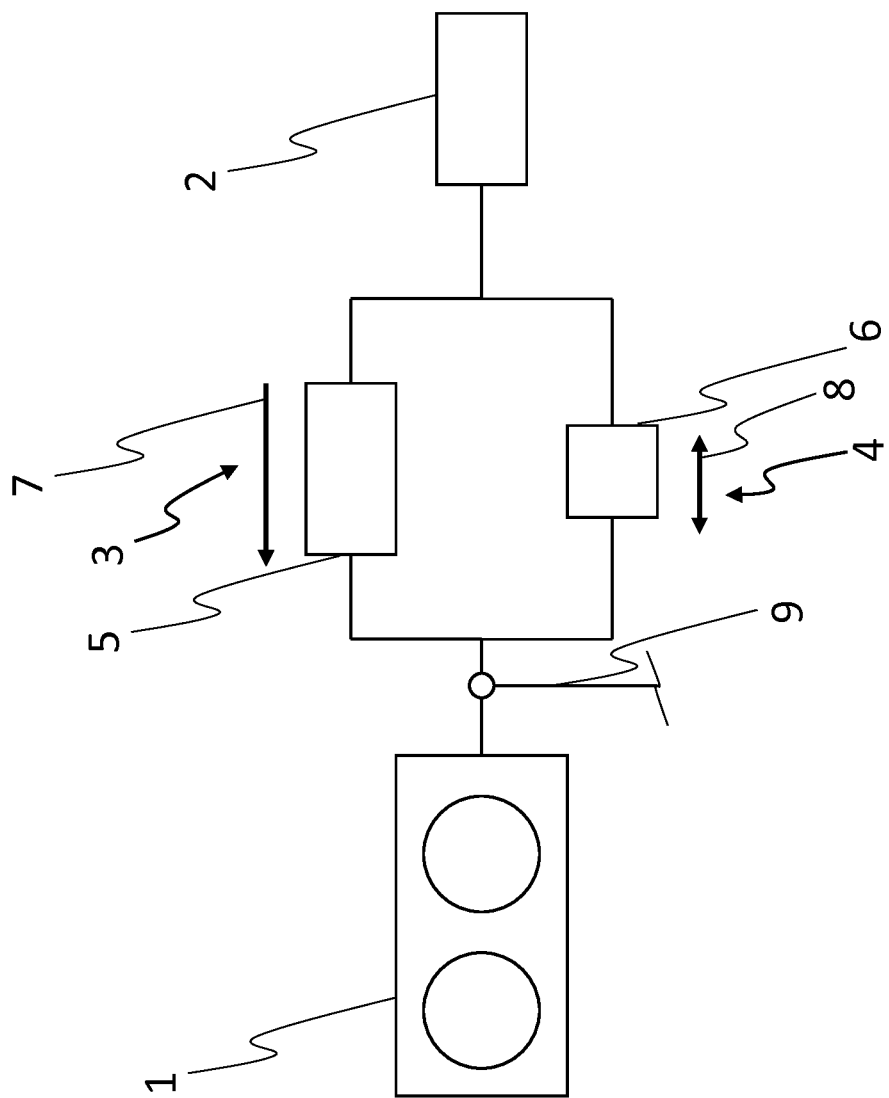

MOTOR VEHICLE DRIVE DEVICE

BACKGROUND AND SUMMARY OF THE INVENTION

This disclosure relates to a motor vehicle drive device having an internal combustion engine and an electromechanical energy converter.

The disclosure is described below with the help of a motor vehicle drivetrain for an automobile; this should not be regarded as limiting the disclosure to an application of this kind. A combination of an internal combustion engine and an electromechanical energy converter in the form of a so-called hybrid drive is frequently used in motor vehicles. If the electromechanical energy converter is "large"-sized, it can supply a power of over 35 kW on a permanent basis if the functional design (starting, driving, regeneration, etc.) is simplified, i.e. this large electromechanical energy converter can easily be used to actuate the internal combustion engine and to drive the motor vehicle. However, the disadvantage of a configuration of this kind is that such a large electromechanical energy converter requires a large amount of installation space, which is usually disadvantageous because the amount of space available is tight. Although a "small"-sized electromechanical energy converter, in other words an energy converter with which no more than 35 kW of power can be made available on a permanent basis, can be used to actuate the internal combustion engine with a corresponding ratio, it is limited on account of this ratio and on account of speed limits when driving the motor vehicle.

A problem addressed by this disclosure is that of specifying an improved motor vehicle drive device. This problem is solved by the inventive motor vehicle drive apparatus disclosed herein.

A basic idea underlying the disclosure is that of connecting an output shaft of an internal combustion engine to an output shaft of an electromechanical energy converter, so-called starter generator, wherein two parallel drivetrains are provided for the connection, wherein parallel refers to the torque transmission of these two drivetrains. Furthermore, each of these two drivetrains comprises a torque transmission device for interrupting the torque transmission and a first of these two drivetrains has a starter generator transmission with a step-down ratio in the direction of the power transfer from the output shaft of the electromechanical energy converter to the output shaft of the internal combustion engine. Furthermore, a second drivetrain of these two drivetrains, in other words the drivetrain which is parallel to this first drivetrain, has a ratio of 1:1, particularly during the torque transmission.

Furthermore, the torque transmission device accommodated in the first drivetrain is designed as a clutch, preferably as a one-way clutch or as a so-called starter freewheel clutch. In this case, this one-way clutch has a blocking direction, wherein torque transmission is possible in the blocking direction and torque transmission is disabled, at least temporarily or permanently, against the blocking direction. A one-way clutch, such as a freewheel clutch, and the one-way clutch is preferably designed as a switchable freewheel clutch.

Further preferably, the torque transmission device of the second drivetrain is designed as a speed-sensitive torque transmission device and preferably as a centrifugal clutch which allows torque transmission from the output shaft of the internal combustion engine to the output shaft of the electromechanical energy converter (closed state) above a predefinable first speed threshold and suppresses it below this first speed threshold (open state).

With the proposed motor vehicle drive device, torque transmission from the starter generator to the internal combustion engine, in particular when starting the internal combustion engine, is made possible via the first drivetrain and therefore with an increase in torque from the starter generator to the internal combustion engine. Furthermore, with the proposed motor vehicle drive device, particularly after starting the internal combustion engine, torque transmission from the internal combustion engine to the starter generator, or in the opposite direction, via the second drivetrain, so in particular without an increase in torque due to the 1:1 ratio of the second drive train, is possible. Tests have shown that an efficient hybrid drive system can be produced with a device of this kind.

In other words, an object of the disclosure is to provide a motor vehicle drive device for a hybrid drivetrain, in other words a motor vehicle drivetrain with an internal combustion engine as the first driving machine and an electromechanical energy converter as the second driving machine. The proposed motor vehicle drive device, in particular the electromechanical energy converter, not only provides sufficient torque at low speeds, so in particular when starting the internal combustion engine, but also at high speeds, so in particular at speeds of the output shaft of the internal combustion engine of more than 2000 1/min for driving a motor vehicle.

This torque supply is made possible despite the motor vehicle drive device, in particular the starter generator, being small in size. The starter generator preferably has a drive power which is smaller than 35 kW, preferably smaller than 25 kW, preferably smaller than 20 kW, and more preferably smaller than 12 kW. Particularly in connection with an automobile, the starter generator has a drive power of preferably up to 35 kW and, more preferably, the starter generator has a drive power of up to 20 kW in connection with a motorcycle.

Another aspect of the disclosure is the use of the so-called starter-generator transmission which also comprises the one-way clutch or is connected thereto for torque transmission. In relation to the torque transmission from the output shaft of the electromechanical energy converter to the output shaft of the internal combustion engine, the one-way clutch is preferably arranged upstream of the starter generator transmission or preferably downstream thereof. Further preferably, the motor vehicle drive device also has in conjunction with this one-way clutch (first drivetrain) the speed-sensitive clutch (second drivetrain), wherein the one-way clutch is arranged in the first drivetrain and the speed-sensitive clutch in the second drivetrain. The starter generator transmission has an input shaft which can be connected to the output shaft at least temporarily for torque transmission or is permanently connected thereto. Furthermore, the output shaft of the internal combustion engine, in particular a so-called crankshaft of the internal combustion engine, can be connected to an output shaft of the starter generator transmission at least temporarily for torque transmission or is permanently connected thereto.

Furthermore, the starter generator transmission has a step-down ratio in relation to the transmission of torque from the input shaft to the output shaft of this transmission, so in particular during the transfer of power from the electromechanical energy converter to the internal combustion engine by means of the starter generator transmission.

Furthermore, the speed-sensitive clutch can be connected to the output shaft of the electromechanical energy converter at least temporarily for torque transmission or is permanently connected thereto. The speed-sensitive clutch is designed in such a manner that it is open until the first speed threshold is reached and is closed above this first speed threshold, such that up to this first speed threshold no torque can therefore be transmitted with the speed-sensitive clutch. Structurally speaking, the speed-sensitive clutch is preferably designed as a centrifugal clutch. More preferably, this first speed threshold is selected from a range which is oriented towards a so-called idle speed of the internal combustion engine. Within the meaning of the disclosure, this idle speed should be understood to mean the speed of the internal combustion engine at which the internal combustion engine can be operated at no load, particularly when the vehicle is stationary, or is operated without driver intervention. More preferably, depending on the engine type, this idle speed falls within a range of 650 1/min to 1000 1/min, particularly in the case of a reciprocating internal combustion engine.

The first speed threshold preferably falls within a range which is greater than 0.75 times the idle speed of the internal combustion engine, preferably 0.85 times, and particularly preferably 0.95 times, and more preferably, this range is smaller than or equal to 1.05 times the idle speed of the internal combustion engine and preferably smaller than or equal to 1.0 times this idle speed and particularly preferably smaller than or equal to 0.97 times this idle speed.

Functionally speaking, the speed-sensitive clutch is designed as a so-called normally-open clutch and is therefore open in the unactuated state, so particularly below the first speed threshold. In particular, the speed-sensitive clutch is open when the internal combustion engine is being started by the electromechanical energy converter. When the speed-sensitive clutch is in the open state, no torque transmission is possible therewith and therefore via the second drivetrain, in particular there is therefore no mechanical connection in the transmission ratio 1:1 of the electromechanical energy converter to the internal combustion engine. In the situation described involving the starting of the internal combustion engine, the second drivetrain is open and the first drivetrain transmits drive power. When the internal combustion engine is started, the drive power is therefore transmitted from the starter generator by means of the starter generator transmission and through the selected step-down ratio the torque supplied by the electromechanical energy converter and acting on the output shaft of the internal combustion engine is increased.

If, particularly during the starting process of the internal combustion engine, the first speed threshold is reached or crossed, this means that the electromechanical energy converter has accelerated the output shaft of the internal combustion engine to a speed sufficient for starting the internal combustion engine and the internal combustion engine has changed to fire mode, so that the speed-sensitive clutch closes on account of the speed ratios occurring at the second drivetrain. The first speed threshold is preferably selected in such a manner, as previously stated, that this closure of the speed-sensitive clutch takes place at a speed "slightly" below the idle speed of the internal combustion engine at the so-called coupling point.

If the speed-sensitive clutch is closed, torque can be transmitted from the internal combustion engine to the electromagnetic energy converter via this speed-sensitive clutch and therefore via the second drivetrain. Functionally speaking, from this point in time (reaching of the coupling point) torque can be transmitted from the electromechanical energy converter preferably only via the speed-sensitive clutch and therefore with a speed ratio of 1:1 between the output shaft of the internal combustion engine and the output shaft of the electromechanical energy converter. This speed ratio of 1:1 results since the one-way clutch is open in the first drive train on account of the speed ratios occurring when the speed-sensitive clutch in the second drivetrain is closed and power is therefore transmitted via the second drivetrain.

In particular, the one-way clutch enables the starter generator transmission only to co-run freely during phases in which the internal combustion engine supplies drive power for driving the motor vehicle either alone or preferably jointly with the starter generator, so no power can be transmitted with this.

In other words, the torque transmission in the second drivetrain with the speed-sensitive clutch, in particular through the direct clutch connection of this clutch, acts bidirectionally and torque can therefore also be delivered from the starter generator, in particular for accelerating the motor vehicle, to the internal combustion engine and therefore to the drive of the motor vehicle. In the opposite drive direction to the drive of the motor vehicle, so from the internal combustion engine to the electromechanical energy converter, regeneration is made possible using the proposed motor vehicle drive device.

By means of regeneration, a charging of an electrochemical energy store, preferably a storage battery, is made possible, wherein during regeneration the electromechanical energy converter is operated in generating mode. If the internal combustion engine is stopped, in particular by means of an automatic start/stop system, as can be specified by an engine control unit, or due to the normal stopping of the vehicle, when the first speed threshold is reached or fallen short of, the speed-sensitive clutch opens and no further torque transmission is possible via the second drivetrain. In this case, the internal combustion engine can be restarted via the first drivetrain, in particular from a standstill, via the starter generator and the starter generator transmission.

The starter generator transmission may be designed as an epicyclic gear train with at least one planet gear and, more preferably, the starter generator transmission is designed as a spur gear with axis-parallel axes spaced apart from one another. More preferably, the starter generator transmission is designed as a combination of a spur gear and an epicyclic gear. In particular, an embodiment in which the starter generator transmission is completely or partially designed as an epicyclic gear, transmissions of this kind are frequently referred to as planetary gears, produces the advantage that the entire system can be reproduced on a shaft and requires a smaller installation space.

The motor vehicle drive device, so in particular the device comprising the centrifugal clutch, one-way clutch and starter generator transmission components, may be connected to the internal combustion engine or to the electromechanical energy converter or to both, to a traction drive, preferably to a belt drive or preferably to a chain drive, or preferably to toothed gearing, or preferably directly connected. A transmission of this kind for connecting the internal combustion engine or the electromechanical energy converter preferably has a fixed transmission ratio; a transmission of this kind can preferably be shifted in at least two shifting stages. In particular by means of a transmission of this kind, the internal combustion engine or the electromechanical energy converter can be adapted to the load requirement in each case.

At least the starter generator transmission and the internal combustion engine or the electromechanical energy converter or all three may have a shared oil supply. More preferably, at least the starter generator transmission is structurally integrated in the electromechanical energy converter or in the internal combustion engine. In particular on account of the proposed measures, a small space requirement for the motor vehicle drive device can be achieved. Furthermore, it is particularly achievable by virtue of the motor vehicle drive device design described above for the entire speed range, or at least a large part thereof, for driving the motor vehicle (starting the internal combustion engine, running of the vehicle) to be covered with electrical support from the starter generator and this despite a "small" electromechanical energy converter.

The starter generator transmission may have for power transmission from the input shaft of the starter generator transmission to the output shaft thereof, in other words power transmission from the electromechanical energy converter to the internal combustion engine, a ratio from the range in which the step-down ratio is greater than 1:6, preferably greater than 1:4, and preferably greater than or equal to 1:3, and more preferably this ratio is smaller than 1:2, preferably smaller than 1:2.5, and particularly preferably smaller than 1:2.75. Tests have shown that with a ratio from the proposed range, a motor vehicle drive device can be presented with which, based on a small installation space requirement, an adequate drive output, in particular an adequate drive torque for accelerating the internal combustion engine from a standstill (starting action), on the one hand, and, on the other hand, for driving the motor vehicle while traveling can be represented.

An embodiment of the disclosure is explained in greater detail below with the help of a schematized FIGURE, in which:

BRIEF DESCRIPTION OF THE DRAWING

FIG. 1 shows a schematized motor vehicle drive system with a motor vehicle drive device.

DETAILED DESCRIPTION OF THE DRAWING

By means of the motor vehicle drive device, the internal combustion engine 1, designed as a reciprocating internal combustion engine with multiple cylinders, is connected to an electromechanical energy converter 2 designed as a starter generator. The motor vehicle drive device has the first drivetrain 3 and the second drivetrain 4.

The starter generator transmission 5 with the one-way clutch is accommodated in the first drivetrain 3. This transmission 5 has a step-down ratio in the torque transmission direction 7 from the electromechanical starter generator 2 to the internal combustion engine 1, the torque transmission direction 7 is determined by the installation of the one-way clutch; a clutch of this kind may also be understood to be a so-called overrunning clutch. By means of this ratio of the starter generator transmission 5, the torque for starting the internal combustion engine 1, which is supplied by the electromechanical starter generator 2, is increased. The one-way clutch in this case is accommodated in the first drivetrain 3 in such a manner that the torque can be transmitted in the torque transmission direction 7.

When the internal combustion engine 1 is started, it is accelerated to starting speed by the electromechanical starter generator 2 via the first drivetrain 3. Once the starting speed has been reached, the internal combustion engine 1 is changed to fire mode. When the internal combustion engine reaches the first speed threshold—this is specified as the speed slightly below the idle speed of the internal combustion engine—the speed-sensitive clutch 6 arranged in the second drivetrain 4 closes the torque transmission and therefore also the speed transmission in the second drivetrain 4.

The second drivetrain 4 has a ratio of 1:1, so is designed as a direct through-drive. When it is in the closed state (first speed threshold crossed), the speed-sensitive clutch 6 therefore couples the internal combustion engine 1 directly with the electromechanical energy converter 2 and therefore a torque transmission between the internal combustion engine 1 and the electromechanical starter generator 2 is facilitated in both directions 8, in other words bidirectionally, via the second drivetrain 4. In regeneration mode, the electromechanical starter generator 2 can therefore be driven with drive power from the drivetrain 9 of the motor vehicle, e.g. in overrun mode, or furthermore it is also possible when the speed-sensitive clutch 6 is closed for power to be transmitted from the internal combustion engine 1 to the electromechanical starter generator 2. In another operating mode, e.g. when the motor vehicle is driven by the internal combustion engine 1, the starter generator 2 may, in addition, supply power and therefore be additionally used for drive purposes; it is therefore possible for the motor vehicle to be driven both purely electrically, purely by the internal combustion engine, or by the two combined.

By closing the speed-sensitive clutch 6, due to the speed ratios occurring at the first drivetrain 3, the one-way clutch in the starter generator transmission 5 is opened and the starter generator transmission 5 runs without torque transmission and therefore in a low-loss manner. Once the internal combustion engine 1 has been switched off and the speed in the second drivetrain 4 has therefore dropped, the speed-sensitive clutch 6 is opened (first speed threshold not reached) and a restart of the internal combustion engine 1 by the electromechanical starter generator 2 via the first drivetrain 3 is therefore made possible once again.

LIST OF REFERENCE NUMBERS 1 internal combustion engine
2 electromechanical energy converter
3 first drivetrain
4 second drivetrain
5 starter generator transmission with one-way clutch
6 speed-sensitive clutch
7 possible torque transmission direction in the first drivetrain
8 possible torque transmission direction in the second drivetrain
9 power transmission to the motor vehicle drivetrain

What is claimed is:
1. A motor vehicle drive apparatus comprising:
a device configured to connect an internal combustion engine to an electromechanical energy converter, wherein the electromechanical energy converter is configured to start the internal combustion engine, and to a starter generator transmission having a first drivetrain which is configured to conduct torque from the electromechanical energy converter to the internal combustion engine during starting of the internal combustion engine, and wherein the starter generator transmission has a step-down ratio in the direction from the electromechanical energy converter to the internal combustion engine and the starter generator transmission also has a second drivetrain which is configured to at least tem- porary conduct a torque in a direction from the internal combustion engine to the electromechanical energy converter, wherein the second drivetrain is arranged parallel to the first drivetrain in relation to torque transmission between the electromechanical energy converter and the internal combustion engine, the first drivetrain has a one-way clutch which is set up in such a manner that torque is transmittable via the first drivetrain from the electromechanical energy converter to the internal combustion engine during starting of the internal combustion engine, the second drivetrain has a speed-sensitive clutch which in a first state is open until a first speed threshold is reached, so that in the first state no torque is transmittable with the second drivetrain from the internal combustion engine to the electromechanical energy converter, and the speed-sensitive clutch is closed from the crossing of this first speed threshold.

2. The motor vehicle drive apparatus according to claim 1, wherein the speed-sensitive clutch is a centrifugal clutch.

3. The motor vehicle drive apparatus according to claim 2, wherein the one-way clutch is a freewheel clutch.

4. The motor vehicle drive apparatus according to claim 3, wherein the starter generator transmission has a ratio in a direction from the electromechanical energy converter to the internal combustion engine of between 1:6 and 1:2.

5. The motor vehicle drive apparatus according to claim 4, wherein the first speed threshold is greater than 0.75 times an idle speed of the internal combustion engine and smaller than 1.05 times the idle speed.

6. The motor vehicle drive apparatus according to claim 5, wherein the starter generator transmission has an epicyclic gear train or is formed from an epicyclic gear train.

7. A motor vehicle drive system comprising:

the motor vehicle drive apparatus according to claim 6, wherein the internal combustion engine and the electromechanical energy converter are connected to the motor vehicle drive apparatus.

8. The motor vehicle drive system according to claim 7, wherein the starter generator transmission and at least the internal combustion engine or the starter generator transmission and at least the electromechanical energy converter share a common oil supply.

9. A motor vehicle having a motor vehicle drive system according to claim 8.

\* \* \* \* \*